United States Patent
Hardy

(10) Patent No.: US 10,862,747 B2
(45) Date of Patent: Dec. 8, 2020

(54) SINGLE USER DEVICE STAGING

(71) Applicant: AirWatch LLC, Atlanta, GA (US)

(72) Inventor: Adam Hardy, Alpharetta, GA (US)

(73) Assignee: AirWatch LLC, Atlanta, GA (US)

( * ) Notice: Subject to any disclaimer, the term of this patent is extended or adjusted under 35 U.S.C. 154(b) by 684 days.

(21) Appl. No.: 14/668,321

(22) Filed: Mar. 25, 2015

(65) Prior Publication Data

US 2016/0285690 A1   Sep. 29, 2016

(51) Int. Cl.
*H04L 29/08* (2006.01)
*H04L 12/24* (2006.01)
*H04L 12/813* (2013.01)
*H04L 29/06* (2006.01)
*H04L 12/927* (2013.01)

(52) U.S. Cl.
CPC .......... *H04L 41/0806* (2013.01); *H04L 47/20* (2013.01); *H04L 47/808* (2013.01); *H04L 63/20* (2013.01); *H04L 67/22* (2013.01); *H04L 67/34* (2013.01); *H04L 41/0893* (2013.01); *H04L 67/306* (2013.01)

(58) Field of Classification Search
CPC . H04L 41/0806; H04L 41/0893; H04L 47/20; H04L 47/808; H04L 63/20; H04L 67/22; H04L 67/306; H04L 41/0886; H04L 63/08; H04L 63/102; G06Q 10/107; G06F 17/30598; H04W 12/06
USPC ....... 709/224, 226, 204; 726/6, 16; 717/172, 717/176
See application file for complete search history.

(56) References Cited

U.S. PATENT DOCUMENTS

| 7,114,021 | B2 | 9/2006 | Seshadri | |
|---|---|---|---|---|
| 7,774,826 | B1 | 8/2010 | Romanek et al. | |
| 7,890,581 | B2 | 2/2011 | Rao et al. | |
| 8,086,698 | B2 | 12/2011 | Rakowski et al. | |
| 8,275,415 | B2 | 9/2012 | Huslak | |
| 8,359,016 | B2 | 1/2013 | Lindeman et al. | |
| 8,499,045 | B2 * | 7/2013 | Little | H04L 63/20 709/206 |
| 8,539,561 | B2 | 9/2013 | Gupta et al. | |
| 8,650,303 | B1 * | 2/2014 | Lang | G06F 21/51 709/226 |
| 8,699,413 | B2 * | 4/2014 | Ring | H04W 4/24 370/328 |
| 8,701,157 | B1 * | 4/2014 | Wilson | H04L 63/08 726/1 |

(Continued)

OTHER PUBLICATIONS

Office Action for U.S. Appl. No. 14/668,409 dated Aug. 25, 2017.
Office Action dated Mar. 24, 2017 for U.S. Appl. No. 14/668,409.
Office Action dated Jan. 30, 2018 for U.S. Appl. No. 14/668,409.

*Primary Examiner* — Tonia L Dollinger
*Assistant Examiner* — Schquita D Goodwin
(74) *Attorney, Agent, or Firm* — Thomas Horstemeyer, LLP

(57) ABSTRACT

Disclosed are various examples for staging client devices. A computing device assigns a first policy to a client device. The computing device later authenticates a user account based at least in part on receipt of a user authentication message from the client device. The computing device then selects a second policy to assign to the client device based at least in part on authentication of the user account. The computing device then assigns the second policy to the client device.

20 Claims, 6 Drawing Sheets

(56) References Cited

U.S. PATENT DOCUMENTS

| | | | |
|---|---|---|---|
| 8,781,500 B1* | 7/2014 | Dekel | H04M 1/72572 455/412.2 |
| 8,914,013 B2 | 12/2014 | Dabbiere | |
| 8,958,828 B2 | 2/2015 | Zheng | |
| 9,141,828 B2 | 9/2015 | Jung et al. | |
| 9,219,741 B2* | 12/2015 | Dabbiere | H04W 4/50 |
| 9,256,743 B2 | 2/2016 | Nissler et al. | |
| 9,271,142 B1* | 2/2016 | Broch | H04L 41/0813 |
| 9,311,457 B1* | 4/2016 | Thirthala | H04L 67/02 |
| 9,319,270 B2 | 4/2016 | Bestmann et al. | |
| 9,391,995 B2 | 7/2016 | Stuntebeck | |
| 9,451,451 B2 | 9/2016 | Chow et al. | |
| 9,602,540 B1* | 3/2017 | Johansson | H04L 63/20 |
| 9,706,407 B2 | 7/2017 | Seo et al. | |
| 2006/0143179 A1 | 6/2006 | Draluk et al. | |
| 2007/0283346 A1* | 12/2007 | Delgrosso | G06F 8/60 717/176 |
| 2008/0139190 A1* | 6/2008 | Bunte | H04M 1/663 455/418 |
| 2010/0115581 A1* | 5/2010 | Goldschlag | H04L 41/0806 726/1 |
| 2010/0180016 A1* | 7/2010 | Bugwadia | G06F 9/4411 709/220 |
| 2010/0210304 A1 | 8/2010 | Huslak | |
| 2010/0223331 A1* | 9/2010 | Brown | G06F 15/16 709/204 |
| 2010/0234050 A1* | 9/2010 | Herrod | H04M 1/72563 455/466 |
| 2010/0293269 A1* | 11/2010 | Wilson | H04L 12/24 709/224 |
| 2010/0299719 A1 | 11/2010 | Burks et al. | |
| 2011/0053574 A1 | 3/2011 | Rice | |
| 2011/0270857 A1* | 11/2011 | Bommireddipalli | H04L 67/10 707/758 |
| 2012/0054625 A1* | 3/2012 | Pugh | G06F 21/41 715/736 |
| 2012/0158991 A1* | 6/2012 | Ajjaguttu | H04B 7/155 709/238 |
| 2012/0159567 A1 | 6/2012 | Toy et al. | |
| 2012/0173682 A1 | 7/2012 | Mantere et al. | |
| 2012/0303476 A1* | 11/2012 | Krzyzanowski | G06F 8/60 705/26.5 |
| 2013/0117423 A1 | 5/2013 | Gupta et al. | |
| 2013/0185285 A1 | 7/2013 | Shuman et al. | |
| 2013/0275560 A1 | 10/2013 | Bestmann et al. | |
| 2013/0281077 A1 | 10/2013 | Zou et al. | |
| 2013/0283047 A1* | 10/2013 | Merrien | H04W 12/08 713/164 |
| 2014/0007222 A1* | 1/2014 | Qureshi | H04L 67/10 726/16 |
| 2014/0101034 A1* | 4/2014 | Tanner | G06Q 20/10 705/39 |
| 2014/0129686 A1 | 5/2014 | Haemel et al. | |
| 2014/0310771 A1 | 10/2014 | Marshall et al. | |
| 2014/0330945 A1 | 11/2014 | Dabbiere et al. | |
| 2014/0344922 A1 | 11/2014 | Lam et al. | |
| 2015/0040235 A1* | 2/2015 | Byrne | H04L 63/0457 726/26 |
| 2015/0067641 A1 | 3/2015 | Nyisztor et al. | |
| 2015/0072741 A1* | 3/2015 | Suresh | H04M 1/0262 455/572 |
| 2015/0199213 A1* | 7/2015 | Desai | G06F 9/468 718/102 |
| 2015/0237193 A1 | 8/2015 | Zeilingold et al. | |
| 2015/0281198 A1* | 10/2015 | Lee | H04W 8/18 726/7 |
| 2015/0295759 A1 | 10/2015 | Mollersten | |
| 2015/0378716 A1* | 12/2015 | Singh | G06F 8/65 717/172 |
| 2015/0379224 A1* | 12/2015 | Rosen | A61B 5/0002 705/2 |
| 2016/0044012 A1* | 2/2016 | Carrer | H04L 41/0803 726/6 |
| 2016/0094560 A1 | 3/2016 | Stuntebeck | |
| 2016/0149958 A1 | 5/2016 | Singh et al. | |

* cited by examiner

SINGLE USER DEVICE STAGING

CROSS REFERENCE TO RELATED APPLICATIONS

This application is related to U.S. application Ser. No. 14/668,409, filed on Mar. 25, 2015, entitled "MULTIUSER DEVICE STAGING," which is incorporated by reference herein in its entirety.

BACKGROUND

Organizations and enterprises often purchase computing devices for use by their employees. Such computing devices can be preconfigured by the seller. However, further configuration is sometimes desired by the organization or enterprise or by individual members of the organization or enterprise using the computing device. For example, organizations or enterprises may wish to install management applications to regulate the data accessible on purchased computing devices or the applications installed on the purchased computing devices.

Management applications can often begin managing a purchased computing device as soon as they are installed. For example, the management application may begin attempting to install applications or limit access to files for the user that installed the management application. However, issues may arise when the user installing the management application is not intended to be managed. For example, an organization may not need or desire to manage use of a computing device by an information technology (IT) worker whose job is to install the management application on newly purchased computing devices before distributing them to employees. If the management application begins to install applications or limit access to files for the IT worker as they prepare a newly purchased computer, the IT worker may be prevented from accessing necessary files or may have unnecessary programs installed on his or her behalf.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for staging managed devices with a set of policies enforced by a management system. A user, such as an administrative user or an information technology (IT) support worker, can install a management component on a device and select a set of policies to be enforced on the device. For instance, policies enforced by the management component can control use of the device, installation of applications on the device, or content accessible on or by the device, as well as other functionality of the device. To install the management component, the user can login to the device using a staging profile. The staging profile can be a profile configured not to cause user specific policies to be enforced on the device. In some examples, a later user will logon to the device and the management system can associate the corresponding user profile with the device and can cause any policies linked to the user profile of the later user to be applied to the device and enforced by the management component installed on the device.

Figure 1:
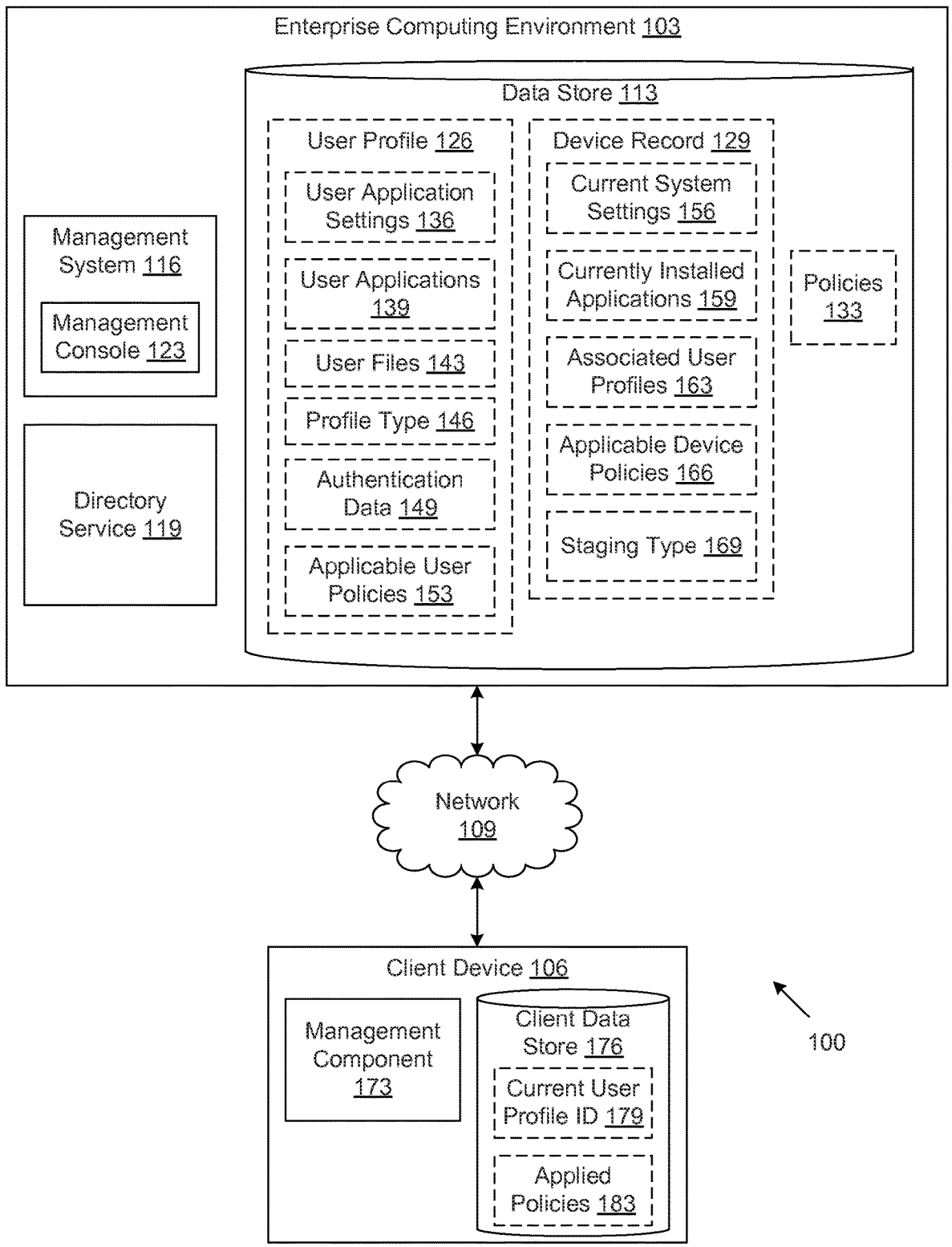
FIG. 1 is a drawing depicting the operation of various examples of the disclosure in a networked environment.

With reference to FIG. 1, shown is an illustrative and non-limiting example of the present disclosure operating within a networked environment 100. The networked environment 100 includes an enterprise computing environment 103 and a client device 106 which are in data communication with each other over a network 109. The network 109 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 is a computing environment that is operated by an enterprise, such as a business or other organization. The enterprise computing environment 103 includes a computing device, such as a server computer, that provides computing capabilities. Alternatively, the enterprise computing environment 103 employs multiple computing devices that are arranged in one or more server banks or computer banks The computing devices in one example are located in a single installation. In another example, the computing devices for the enterprise computing environment 103 are distributed among multiple different geographical locations. In one case, the enterprise computing environment 103 includes multiple computing devices that together form a hosted computing resource or a grid computing resource. Additionally, the enterprise computing environment 103, in some examples, operates as an elastic computing resource where the allotted capacity of computing-related resources, such as processing resources, network resources, and storage resources, vary over time. In other examples, the enterprise computing environment 103 includes or is operated as one or more virtualized computer instances. Generally, the enterprise computing environment 103 is operated in accordance with particular security protocols such that the enterprise computing environment 103 is considered a "trusted" computing environment by the enterprise that operates the enterprise computing environment 103.

The components executed on the enterprise computing environment 103 include a management system 116, a directory service application 119, and other applications, services, processes, systems, engines, or functionality not discussed in detail herein. The management system 116 is executed in the enterprise computing environment 103 to monitor and manage the operation of one or more client devices 106. The directory service 119 is executed to map authentication credentials, such as usernames and passwords, entered on a client device 106 to a user profile 126.

In some examples, the management system 116 includes a management console 123, which facilitates the administration of client devices 106 by administrators. For instance, the management console 123 generates user interfaces that are rendered on a display device to facilitate administrators operating and interacting with the management system 116. Such user interfaces facilitate an administrator inputting commands or other information for the management system 116. The commands can include specifying that a particular user profile 126 is to be managed or unmanaged. The information can include the data and applications that are to be accessible or inaccessible to the specified user profile 126. The user interfaces also include, for example, presentations of statistics or other information regarding the client devices 106 that are managed by the management system 116. The data stored in the data store 113 includes one or more user profiles 126, one or more device records 129, one or more policies 133, and potentially other data.

User profiles 126 represent network user accounts which a user can use to login to the client device 106. In one example, a user profile 126 can include data for the corresponding user, such as user application settings 136, user applications 139, user files 143, a profile type 146, authentication data 149, and/or applicable user policies 153. Application settings 136 can represent user specific or customized settings for individual applications, such as a user specific configuration for an email client, virtual private network (VPN) client, browser application, word processor application, spreadsheet application, presentation application, or similar applications. Application settings 136, in one example, can be specified by an administrator through the management console 123, which can be transmitted to the device by the management system 116. User applications 139 represent applications executable on the client device 106 which a user is authorized to execute. User files 143 represent data files of a user, including the type, location, name, size, and other metadata for individual data files.

The profile type 146 represents the type of user profile 126. For example, the profile type 146 can specify that a user profile 126 is for a managed user (i.e. a user profile 126 managed by the management system 116), an unmanaged user (i.e. a user profile 126 that is not managed by the management system 116), an administrative user (i.e. a user profile 126 with administrative rights for one or more client devices 106), a staging user (i.e. a user profile 126 that is able to install the management component 173 without the user profile 126 being added to the list of associated user profiles 163), a nonstaging user (i.e. a user profile 126 that is unable to install the management component 173 without the user profile 126 being added to the list of associated user profiles 163), and/or other type of user. The profile type 146 can be set programmatically or by a user interface provided by the management console 123. Further, in some examples, a user profile 126 can be assigned multiple profile types 146.

As previously described, a managed user corresponds to a user profile 126 managed by the management system 116. As a further example, a managed user can include a user of the client device 106 who is an agent or employee of the entity or organization that owns the client device 106. As such, access to the client device 106 and usage of the client device 106 can be managed by the management system 116 as indicated above. In some embodiments, a managed user can correspond to a user that authenticates himself or herself using accounts provided by the directory service 119.

As previously described, an unmanaged user corresponds to a user profile 126 that is not managed by the management system 116. As a further example, an unmanaged user can include a user of the client device 106 who is not an agent or employee of the entity organization that owns the client device 106. For example, an unmanaged user can correspond to a user that authenticates himself or herself using local user accounts provided by the client device 106 instead of using accounts provided by the directory service 119. However, in embodiments where only a portion of the accounts provided by the directory service 119 are managed by the management system 116, an unmanaged user can correspond instead to a user account provided by the directory service 119 that is not managed by the management system 116. Such accounts can include accounts of inactive or former users as well accounts specifically created with the intent to be unmanaged.

As previously described, an administrative user corresponds to a user profile 126 with administrative rights for one or more client devices 106. As a further example, an administrative user can also be a staging user in some embodiments, because a staging user may need certain administrative rights to the client device 106 in order to install the management component 173 as previously described. As another example, an administrative user can also be an unmanaged user. For example, an administrative user may need uninhibited control of a client device 106 and therefore may also be classified as an unmanaged user in order to prevent the management system 116 from preventing the administrative user from performing various duties.

The authentication data 149 represents data used to authenticate logon attempts to the client device 106 with the user profile 126. The authentication data 149 can include a username, password, authentication token, unique object identifier, unique profile identifier, and/or other similar data. As an example, the authentication data 149 can correspond to the username, password, authentication token, and unique object or profile identifier used by the directory service 119 to manage logons with network user accounts. Applicable user policies 153 represent a set of one or more policies 133 to be enforced by the management system 116 to a client device 106 when a user has logged into the client device 106 with the user profile 126.

Device records 129 represent information used by the management system 116 in managing a client device 106. Each device record 129 can include one or more current system settings 156, a list of one or more currently installed applications 159, one or more associated user profiles 163, one or more applicable device policies 166, and/or a setting representing a staging type 169 for corresponding client device 106. Current system settings 156 can represent a current configuration of the hardware of a client device 106 or the operating system of the client device 106 and its various components. For example, the current system settings 156 can include the current hardware configuration of the client device 106, the current network configuration used by the operating system of the client device 106, the current directory service 119 or server used by the operating system for authenticating user accounts, and/or similar system configuration details. The currently installed applications 159 can represent a set or list of currently installed applications, such as communication applications, productivity applications, multimedia applications, and/or other applications executed on the client device 106. The associated user profiles 163 can represent one or more user profiles 126 that have logged onto the client device 106 and/or one or more user profiles 126 that would trigger the application of one or more policies 133 when one of the user profiles 126 is logged on to the client device 106. Applicable device policies 166 can represent one or more policies 133 to be applied to the client device 106 independently of any association of the client device 106 with a user profile 126. The staging type 169 can represent whether the device has been configured for single user staging or multiuser staging, as will be further described herein.

Policies 133 represent any action that can be taken with respect to the client device 106 or any limitation that can be imposed on the operation of the client device 106. Each policy 133 can specify a single action to be taken or limitation to be imposed. For example, a policy 133 can require that disk encryption be enabled for the client device 106. Another policy 133 can specify that particular user files 143 specified in the policy 133 should be downloaded to the client device 106 when a user logs in to the client device 106 with the corresponding user profile 126. The particular user files 143 may include any one or more of the user 143 previously discussed above. Another policy 133 can specify particular user files 143 to be encrypted on the client device 106 when stored on or in use by the client device 106. Other policies 133 can specify that a particular user application 139, such as those previously discussed, should be installed to the client device 106. As another example, a policy 133 may specify that a particular user application 139 executing on the client device 106 should be configured in a particular manner, such as by specifying that user application settings 136 be downloaded and applied to the particular user application 139. Similarly, a policy 133 may specify that usage of a particular user application 139 installed on the client device 106 be limited in a specified manner. For example, a user application 139 may be prohibited from accessing certain network resources, such as particular servers, being accessed in particular locations, such as accessing personal emails at work or work emails at home, or otherwise limiting usage of the particular user application 139 specified in the policy 133.

The client device 106 is representative of multiple client devices 106 that are coupled to the network 109. The client device 106 includes, for example, a processor-based computer system. According to various examples, a client device 106 is embodied in the form of a desktop computer, a laptop computer, a personal digital assistant, a mobile phone, a web pad, or a tablet computer system. The client device 106 includes output devices, such as a display and audio speakers, as well as one or more input devices, such as a mouse, keyboard, touch pad, or touch screen, which facilitate a user interacting with the client device 106. The client device 106 can also be configured to execute a management component 173, as well as other applications. The client device 106 can also include a local data store 176, which can store the current user profile identifier 179, a list of applied policies 183, as well as other data.

The current user profile identifier 179 represents authentication data 149, such as a username, authentication token, or other unique identifier, that identifies the user profile 126 of the user currently logged into the client device 106. The applied policies 183 represent the set of policies 133 currently applied to the client device 106 and enforced by the management system 116 and/or the management component 173. The applied policies 183 can represent, for example, the union of (i) the set of applicable device policies 166 listed in the device record 129 of the client device 106 and (ii) the set of applicable user policies 153 listed in the user profile 126 of the user currently logged into the client device 106 as identified by the current user profile identifier 179.

The management component 173 can be executed in the client device 106, for example, to monitor and manage data, software components, and hardware components with respect to the client device 106. The management component 173 can communicate with the management system 116 to facilitate the management system 116 in monitoring and managing the client device 106. For example, the management component 173 transmits data that indicates the status of properties and settings for the client device 106, such as the current user profile identifier 179, as well as one or more policies 183 currently applied to the client device 106 or the current user of the client device 106. The management component 173 can apply and/or enforce the currently applied policies 183. In one example, the management component 173 functions as a device management service that operates as a portion of an operating system for the client device 106. In another example, the management component 173 functions as a device management agent that operates in the application layer of the client device 106. The management component 173, in other examples, can include an application wrapper that interfaces with a software component to facilitate overseeing, monitoring, and managing resources for the client device 106. In alternative examples, the management component 173 includes a portion of an application that was developed, for example, using a Software Development Kit (SDK) so that the monitoring and management functionality is provided using the application.

Next, a general description of the operation of the various components of the networked environment 100 is provided. To begin, a first user logs into a client device 106 using a user profile 126 with a profile type 146 identifying the user as a staging user. The first user can then install the management component 173 onto the client device 106 and bind the client device 106 to a directory service 119. Binding can include creating a record in the directory service 119 corresponding to the client device 106 or similar action. In some examples, however, the client device 106 can be automatically bound to the directory service 119 by the management component 173 and/or the management system 116 after installation of the management component 173.

After installation of the management component 173 on the client device 106, the management component 173 can determine the current user profile identifier 179 of the currently logged in staging user and send the current user profile identifier 179 to the management system 116. The management system 116 can then determine that the profile type 146 of the user profile 126 matching the current user profile identifier 179 corresponds to a staging user profile 126. As a result of such a determination, the management system 116 can withhold sending policies 133 to the client device 106.

After the client device 106 has been configured by the first user, a device record 129 corresponding to the client device 106 can be created by the management system 116. In various examples, the management component 173 can determine the current system settings 156 and the currently installed applications 159 and can report this information to the management system 116. The management component 173 then programmatically creates a device record 129 for the client device 106. However, in some examples, the device record 129 can be manually created by a user interface can be supplied by the management console 123 and the components of the device record 129 can be manually entered by an administrator or an administrative user.

After installation of the management component 173 and creation of the corresponding device record 129, the management component 173 can evaluate logon events on the client device 106 to detect a logon event generated by a logon of a second user and can determine whether the logon event corresponds to a first attempt by the second user to logon to the client device 106 for the first time. After detecting that the second user has logged on, the management component 173 can query the authentication data 149 of the user profile 126 of the second user to determine if the login attempt is valid. If the login attempt is valid, the management system 116 can determine whether the profile type 146 for the user profile 126 of the second user identifies the second user as a managed user. If the second user is a managed user, then the management system 116 can add the user profile 126 of the second user to the set of associated user profiles 163 of the device record 129 for the client device 106. The management system 116 can then send the policies 133 identified in the set of applicable user policies 153 and/or the set of applicable device policies 166 to the management component 173. The management component 173 can then evaluate individual ones of the policies 133 in the set of applicable user policies 153 to determine whether the current state of the client device 106 complies with the policy 133.

Figure 2:
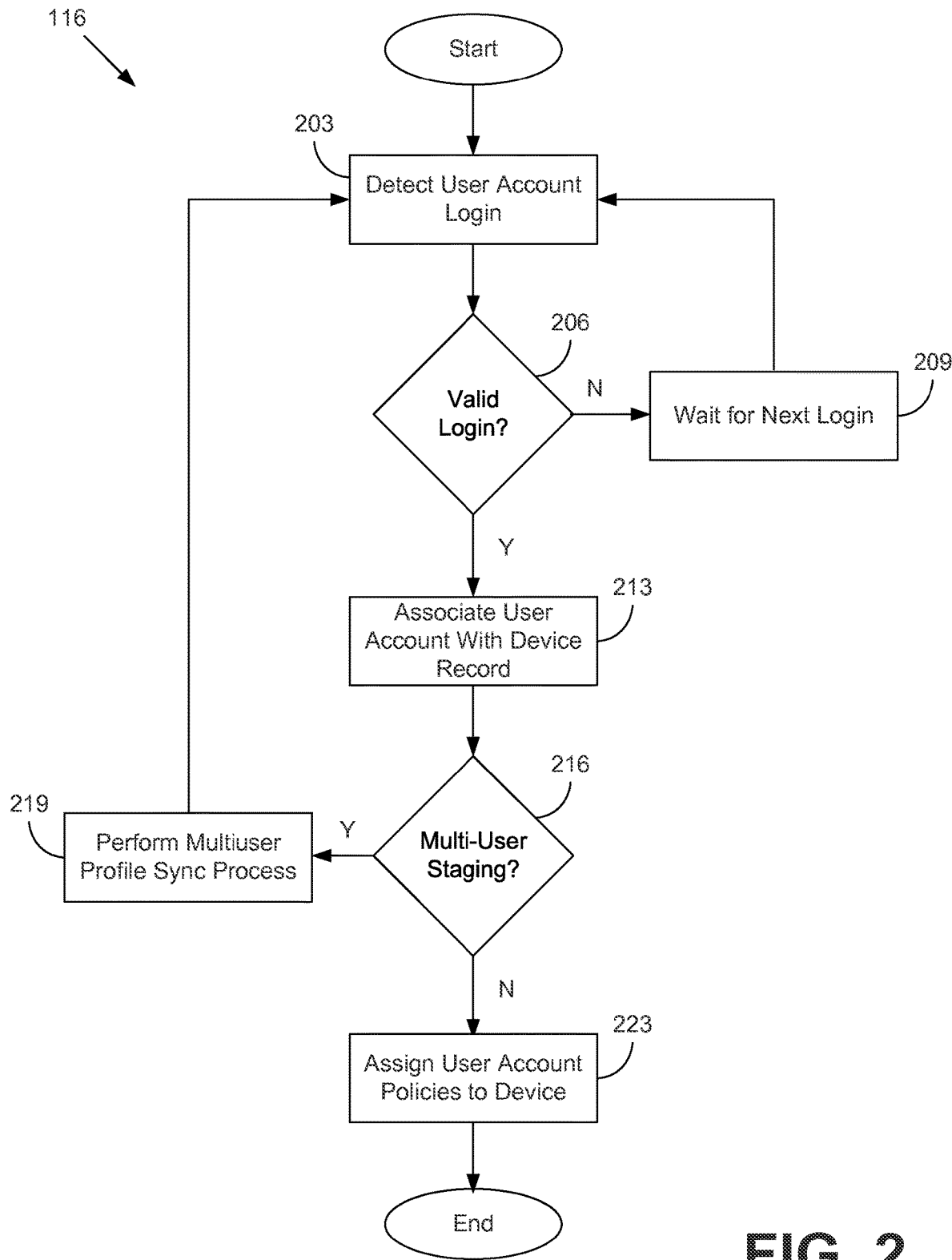
FIG. 2 is a flowchart illustrating one example of functionality implemented in a computing environment in a networked environment.

Referring next to FIG. 2, shown is a flowchart that provides one example of the operation of a portion of the management system 116 according to various examples. It is understood that the flowchart of FIG. 2 provides merely an example of the many different types of functional arrangements that can be employed to implement the operation of the portion of the management system 116 as described herein. As an alternative, the flowchart of FIG. 2 can be viewed as depicting an example of elements of a method implemented in the enterprise computing environment 103 (FIG. 1) according to one or more examples.

Initially, a user, such as an administrator or IT support user, logs into the client device 106 (FIG. 1) using a user profile 126 (FIG. 1) with a profile type 146 (FIG. 1) indicating that the user profile 126 is a staging user profile 126. The user may, for example, use the credentials stored in the authentication data 149, which can be validated by the directory service 119 as previously described. While logged into the client device 106 with a staging user profile 126, the management component 173 (FIG. 1) is installed. For example, the management component 173 can be installed using any one of a number of software installation tools or approaches. Because the user profile 126 used to install the management component 173 is a staging user profile, the management component 173 and the management system 116 do not, in one example, associate the user profile 126 with a device record 129 (FIG. 1) representing the client device 106. In other examples, a staging user profile and subsequent user profile can be merged or combined to create a device record 129.

Proceeding to step 203, the management system 116 can detect a user account login. The management system 116 can detect the login with one or more approaches. For example, the management component 173 can detect the user logging on to the client device 106 and report the login attempt to the management system 116. As another example, the directory service 119 (FIG. 1) can report the login attempt to the management system 116 when the directory service 119 receives the authentication credentials from the client device 106 that were entered by the user. In some examples, the management system 116 may directly receive the request to login.

Moving on to step 206, the management system 116 can then determine whether the login by the user was a valid login. The management system 116 can make this determination with one or more approaches. The management system 116 may, for example, query the directory service 119 to determine if the user login attempt was for a valid user profile 126. A user profile 126 may be considered valid, for example, if the user profile 126 is currently activated and/or authorized to login to the client device 106. Alternatively, the management system 116 can query the management component 173 for the current user profile identifier 179 (FIG. 1). If the user login attempt is determined to not correspond to a valid user profile 126, then the previously described process proceeds to step 209. However, if the user login attempt is determined to be for a valid user profile 126, then the previously described process proceeds to step 213.

Referring next to step 209, the management system 116 can wait to receive notification of another login attempt. The management system 116 may, for example, poll the directory service 119 and/or the client device 106 on a periodic basis to see if a subsequent login attempt has occurred. In another example, the management system 116 may listen for a notification of another login attempt, which may be sent by either the directory service 119 or the client device 106. Execution then loops back to step 203, where subsequent login attempts are detected in the manner previously described.

Proceeding to step 213, the management system 116 can associate the user profile 126 of the validated user with the device record 129 of the client device 106. For example, the management system 116 can add the user profile 126 to the list of associated user profiles 163 included in the device record 129 of the client device 106. In some examples, the management system 116 can also mark the profile type 146 as a managed user profile 126, if the user profile 126 is not already indicated as managed user profile 126.

Moving on to step 216, the management system 116 can determine whether the client device 106 has had multiuser staging enabled. The management system 116 may, for example, query the data store 113 (FIG. 1) to determine whether the staging type 169 (FIG. 1) for the device record 129 indicates whether single user staging or multiuser staging has been enabled for the client device 106. If multiuser staging has been enabled, then the previously described process proceeds to step 219. If multiuser staging has not been enabled or single user staging has been enabled, then the previously described process proceeds to step 223.

Referring next to step 219, the management system 116 can perform a multiuser synchronization of user profiles 126 associated with the client device 106. As part of the synchronization process, the management system 116 can identify the set of currently applied policies 183 (FIG. 1) to the client device 106 reported by the management component 173. The management system 116 then compares the set of currently applied policies 183 with the set of applicable user policies 153 (FIG. 1) of the user profile 126 corresponding to the current user profile identifier 179 as well as the set of applicable device policies 166 (FIG. 1) specified in the device record 129 corresponding to the client device 106. The management system 116 then sends any policies 133 to the management component 173 included in either the set of applicable user policies 153 or the set of applicable device policies 166 that are not part of the currently applied policies 183. The management system 116 further sends instructions to the management component 173 to remove any polices 133 that are part of the set of currently applied policies 183 but not included in either the set of applicable user policies 153 or the applicable device policies 166. The previously described process of the management system 116 then loops back to step 203 to detect the next login.

However, proceeding to step 223, the management system 116 can assign the applicable user policies 153 corresponding to the currently logged in user profile 126 to the client device 106. The management system 116 may, for example, query the data store 113 to identify the list of applicable user policies 153 for the user profile 126 matching the current user profile identifier 179 previously supplied by the management component 173. The management system 116 can then send the appropriate policies 133 (FIG. 1) identified in the list of applicable user policies 153 to the management component 173 for enforcement on the client device 106. The previously described process of the management system 116 then ends.

Figure 3:
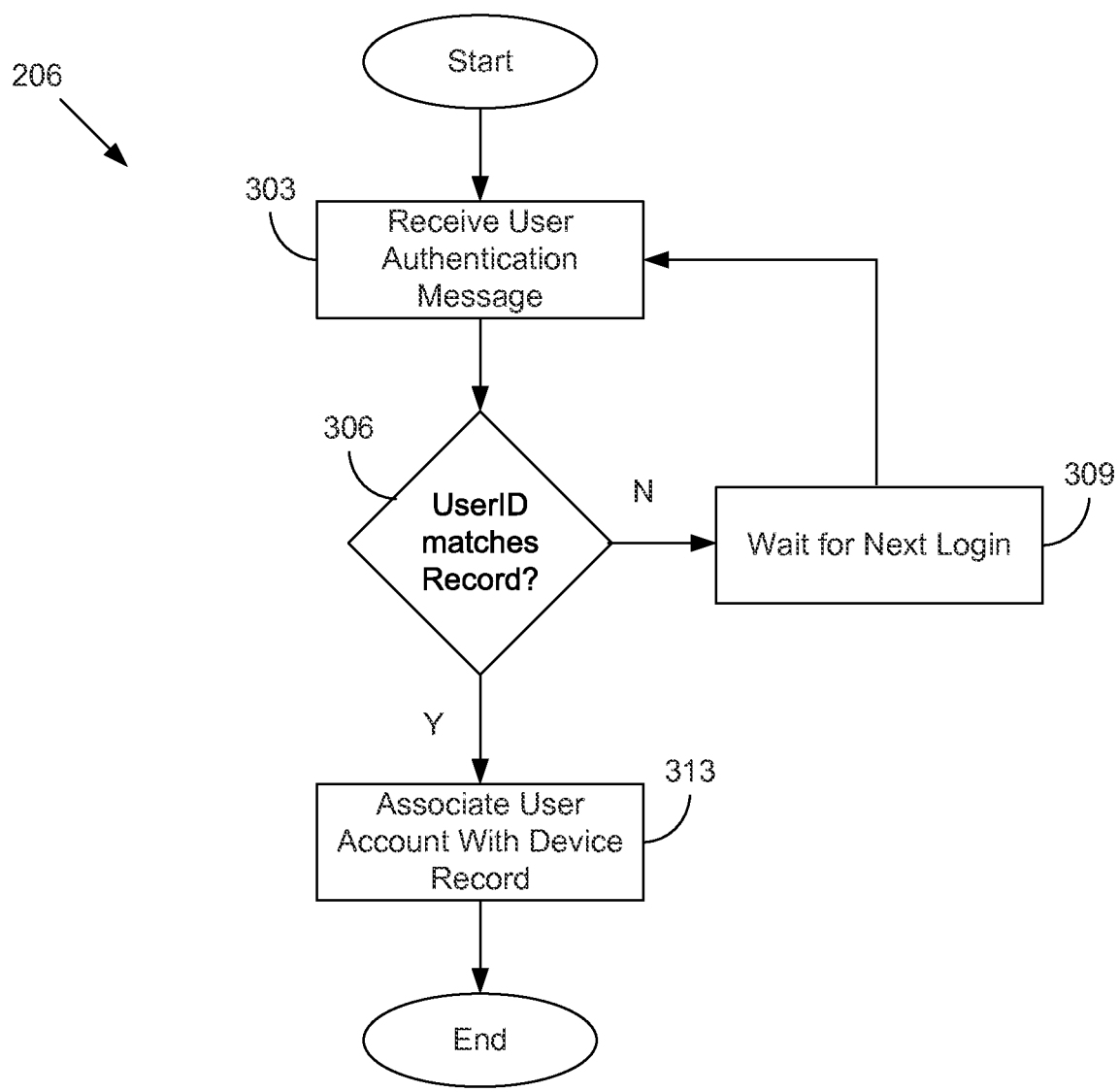
FIG. 3 is a flowchart illustrating one example of functionality implemented in a computing environment in a networked environment.

Referring next to FIG. 3, shown is a flowchart that provides one example of the operation of a portion of management system 116, as previously depicted in step 206 of FIG. 2, according to various examples. It is understood that the flowchart of FIG. 3 provides merely one example of the many different types of functional arrangements that can be employed to implement the operation of the portion of the management system 116 as described herein. As an alternative, the flowchart of FIG. 3 can be viewed as depicting an example of elements of a method implemented in the enterprise computing environment 103 (FIG. 1) according to one or more examples.

Beginning with step 303, the management system 116 can receive a user authentication message from the management component 173 (FIG. 1). In some examples, the user authentication message can include information originally supplied by a directory service 119 (FIG. 1). In other examples, the user authentication message can be generated by the management component 173 (FIG. 1) using information available to the management component 173, such as the username and password entered on the client device 106.

Referring next to step 306, the management system 116 determines whether a user identifier in the received user authentication message matches a user identifier defined in the authentication data 149 (FIG. 1) of a user profile 126 (FIG. 1) located in the data store 113 (FIG. 1). If the user identifier received in the user authentication message does not match a user identifier defined in the authentication data 149 of the user profile 126, then the previously described process proceeds to step 309. However, if the user identifier received in the user authentication message does match a user identifier defined in the authentication data 149 of the user profile 126, then the previously described process proceeds to step 313.

Proceeding next to step 309, the management system 116 can wait to receive notification of another login attempt. Execution then loops back to step 303 upon receipt of another user authentication message.

Moving on to step 313, the management system 116 can associate the user profile 126 with the device record 129 of the client device 106. For example, the management system 116 can add the user profile 126 to the list of associated user profiles 163 included in the device record 129 of the client device 106. In some examples, the management system 116 can also mark the profile type 146 as a managed user profile 126, if the user profile 126 is not already indicated as a managed user profile 126. The previously described process of the management system 116 then ends.

Figure 4:
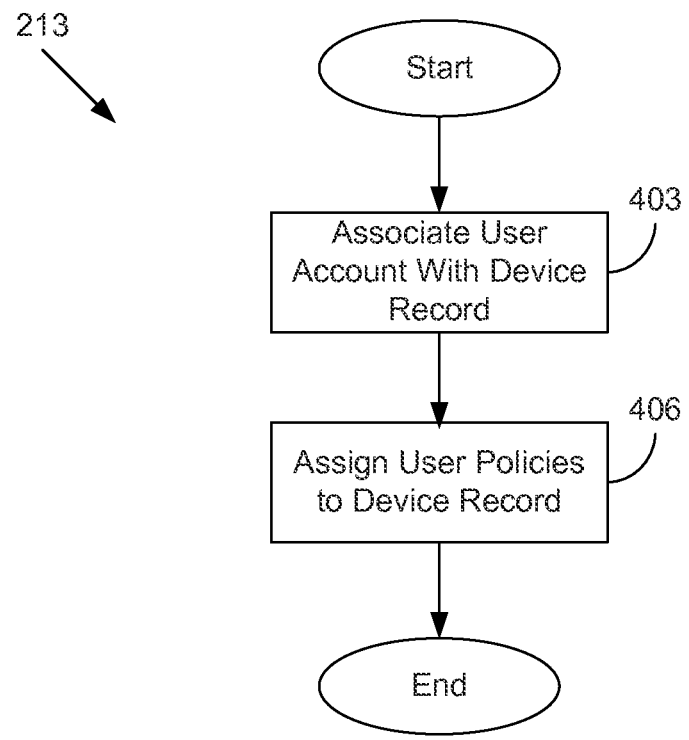
FIG. 4 is a flowchart illustrating one example of functionality implemented in a computing environment in a networked environment.

Referring next to FIG. 4, shown is a flowchart that provides one example of the operation of a portion of management system 116, as previously depicted in step 213 of FIG. 2, according to various examples. It is understood that the flowchart of FIG. 4 provides merely an example of the many different types of functional arrangements that can be employed to implement the operation of the portion of the management system 116 as described herein. As an alternative, the flowchart of FIG. 4 can be viewed as depicting an example of elements of a method implemented in the enterprise computing environment 103 (FIG. 1) according to one or more examples.

Beginning with step 403, the management system 116 associates a user profile 126 (FIG. 1) with a device record 129 (FIG. 1) corresponding to the client device 106. For example, the management system 116 can create an entry in the data store 113 within the device record 129 adding the user profile 126 to the list of associated user profiles 163 (FIG. 1).

Moving on to step 406, the management system 116 assigns policies 133 (FIG. 1) identified in the set of applicable user policies 153 (FIG. 1) to the client device 106 (FIG. 1). Exemplary policies 133 of the applicable user policies 153 may include any one or more of the policies 133 previously discussed above. The previously described process of the management system 116 then ends.

Figure 5:
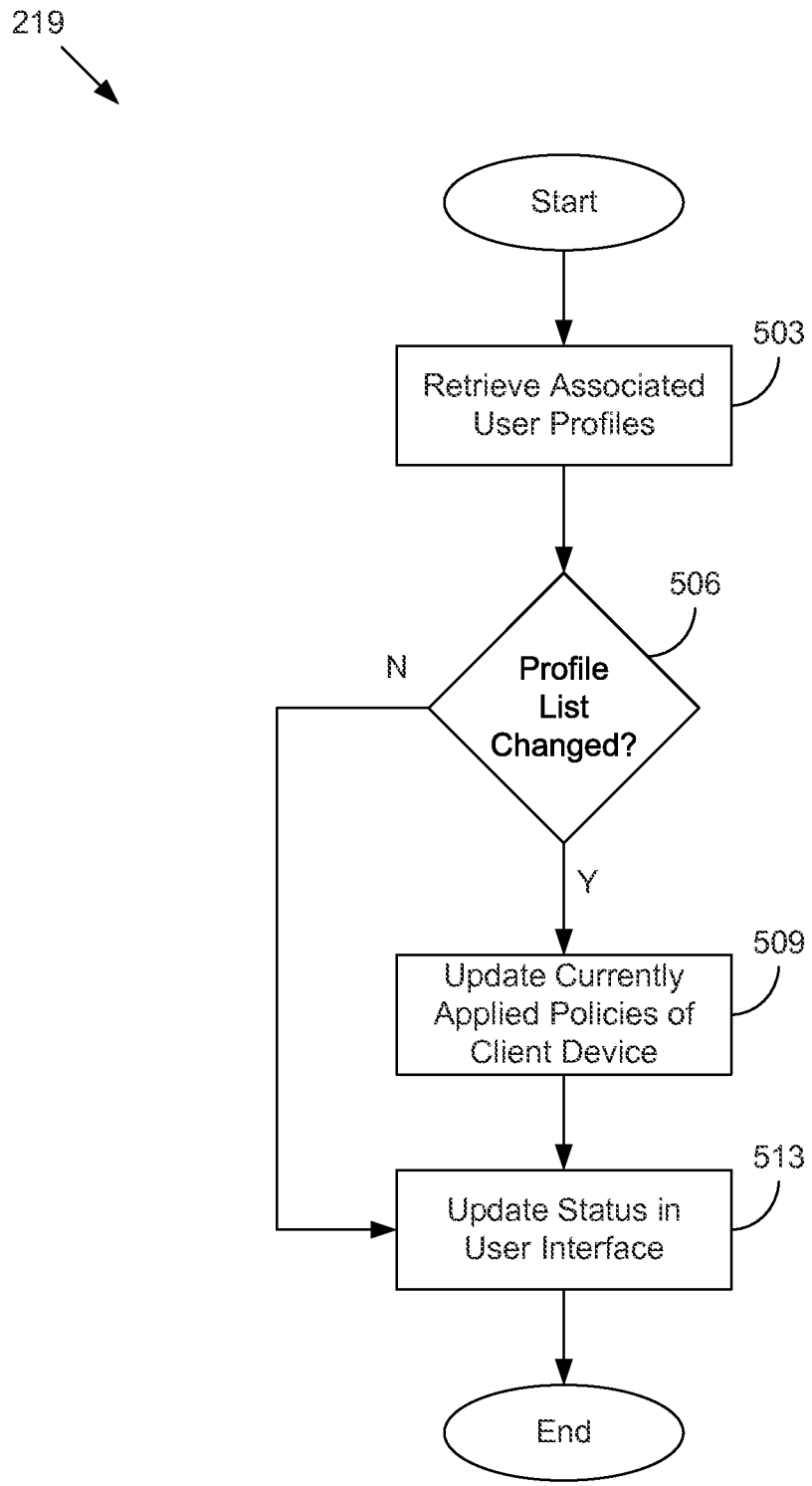
FIG. 5 is a flowchart illustrating one example of functionality implemented in a computing environment in a networked environment.

Referring next to FIG. 5, shown is a flowchart that provides one example of the operation of a portion of management system 116, as previously depicted in step 219 of FIG. 2, according to various examples, for performing the multiuser profile sync process. It is understood that the flowchart of FIG. 5 provides merely an example of the many different types of functional arrangements that can be employed to implement the operation of the portion of the management system 116 as described herein. As an alternative, the flowchart of FIG. 5 can be viewed as depicting an example of elements of a method implemented in the enterprise computing environment 103 (FIG. 1) according to one or more examples.

Beginning with step 503, the management system 116 retrieves the list of associated user profiles 163 (FIG. 1) from the device record 129 (FIG. 1) corresponding to the client device 106 (FIG. 1). For example, the management system 116 can send a structured query language (SQL) or similar database query to the data store 113 (FIG. 1) specifying the device record 129 and requesting the list of associated user profiles 163 included in the device record 129.

Proceeding next to step 506, the management system 116 determines whether there have been any changes to the list of associated user profiles 163, such as the addition of a user profile 126 (FIG. 1) or the removal of a user profile 126 from the list of associated user profiles 163. For example, the management system 116 can compare the retrieved list of associated user profiles 163 with a cached copy of a previously retrieved list of associated user profiles 163. If there have been no changes to the associated user profiles 163, then the previously described process skips to step 513. However, if list of associated user profiles 163 has changed, then the previously described process proceeds to step 509.

Moving on to step 509, the management system 116 updates the currently applied policies 183 (FIG. 1) for the client device 106. For example, the management system 116 can determine that one or more policies 133 (FIG. 1) identified in the applicable device policies 166 (FIG. 1) of the device record 129 (FIG. 1) for the client device 106 are not included in the list of currently applied policies 183. For example, an administrator may apply a new policy 133 designed to increase password strength by increasing the minimum number of password characters, such as increasing the minimum number of characters from four to six. In such instances, the management system 116 can send one or more policies 133 from the applicable device policies 166 to the management component 173 to be included among the currently applied policies 183 and enforced by the management component 173. In other instances, the management system 116 can determine that, because the currently logged in user is different from a previously logged in user, one or more of the policies 133 in the list of applicable user polices 153 (FIG. 1) of the user profile 126 of the currently logged in user are not included among the currently applied policies 183. In such an instance, the management system can send one or more policies 133 from the applicable user policies 153 to the management component 173 to be included among the currently applied policies 183 and enforced by the management component 173.

In various examples, the management system 116 can also cause individual polices 133 within the group of currently applied polices 183 to be removed from the set of currently applied polices 183. For example, the management system 116 can identify a policy 133 within the group of currently applied policies 183 that is not listed in the applicable device policies 166 of the device record 129 or in the list of applicable user policies 153 for the user profile 126 of the currently logged in user. For example, the management system 116 could determine that a policy 133 specifying that a particular application be installed on the client device 106 is included in the group of currently applied policies 183 but is not listed among either the applicable device policies 166 or the applicable user policies 153. In such instances, the management system 116 can send a message to the management component 173 that includes an identifier of the policy 133 and instructions to the management component 173 to remove the identified policy 133 from the set of currently applied policies 183.

Referring next to step 513, the management system 116 updates the status of the client device 106 depicted in a user interface provided by the management console 123 (FIG. 1). For example, the management system 116 can update the policies 133 listed on the user interface as currently in force for the client device 106. The management system 116 can also cause the user interface of the management console 123 to update the identification of the user profile 126 of the user currently logged into the client device 106. The previously described process of the management system 116 then ends.

Figure 6:
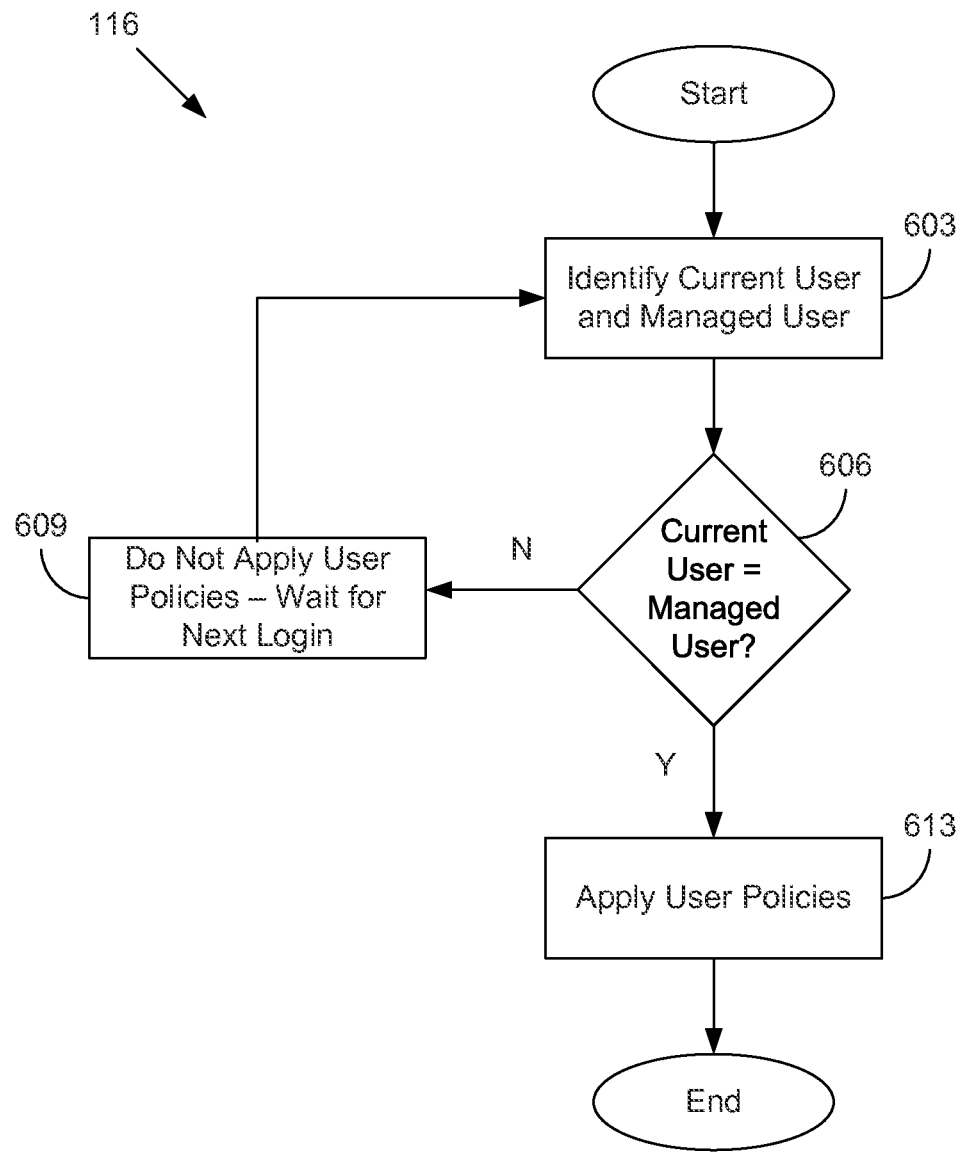
FIG. 6 is a flowchart illustrating one example of functionality implemented in a computing environment in a networked environment.

Referring next to FIG. 6, shown is a flowchart that provides one example of the operation of a portion of management system 116 according to various examples. It is understood that the flowchart of FIG. 6 provides merely an example of the many different types of functional arrangements that can be employed to implement the operation of the portion of the management system 116 as described herein. As an alternative, the flowchart of FIG. 6 can be viewed as depicting an example of elements of a method implemented in the enterprise computing environment 103 (FIG. 1) according to one or more examples.

Beginning with step 603, the management system 116 can identify the user profile 126 (FIG. 1) of the user currently logged into the client device 106 and a list of user profiles 126 of managed users for the client device 106. The management system 116 can determine, for example, the user profile 126 of the user currently logged into the client device 106 by querying the management component 173 (FIG. 1) and/or the directory service 119 (FIG. 1) for an identifier of the user profile 126 for the currently logged in user, such as a username or other unique identifier. The management system 116 can then query the data store 113 (FIG. 1) for the user profile 126 that includes the username or other unique identifier in the authentication data 149 (FIG. 1) of the user profile 126.

Moving on to step 606, the management system 116 can determine whether the currently logged in user is a user to be managed by the management system 116 and the management component 173. The management system 116 may, for example, determine whether the user profile 126 of the currently logged in user is included in the list of associated user profiles 163 (FIG. 1). If the user profile 126 is included in the list of associated user profiles 163, the management system 116 can further check the profile type 146 of the user profiles 126 to determine whether the user profile 126 is a managed user profile 126 instead of an unmanaged user profile 126, such as a staging user profile 126. If not, then execution proceeds to step 609. Referring next to step 609, the management system 116 sends a message to the management component 173 indicating that the currently logged in user is not a managed user, causing the management component 173 not to enforce any policies 133 identified in the list of applicable user policies 153 for the user profile 126 of the currently logged in user. The previously described process then loops back to step 603.

However, if the user profile 126 is included in the list of associated user profiles 163 and has a profile type 146 that indicates that the user profile 126 is a managed user profile 126, then the management system 116 can determine that the current user is a user that is to be managed by the management system 116 and the management component 173.

Proceeding next to step 613, the management system 116 sends a message to the management component 173 indicating that the currently logged in user is a managed user, causing the management component 173 to enforce any policies 133 identified in the list of applicable user policies 153 for the user profile 126 of the currently logged in user. The previously described process of the management system 116 then ends.

For example, the policy 133 enforced as a result of step 613 may modify the applications installed on the client device 106 or the content accessible to a user of the client device 106. For example, a policy 133 applied as a result of step 613 may cause a particular application, such as a VPN application, email application, or other application, to be installed on the client device 106. In contrast, such a policy 133 would not be applied as a result of step 609, and the application specified by the policy would not be installed if the process had proceeded to box 609 instead of box 613. As another example, a policy 133 applied as a result of step 613 may specify that certain files, such as a user's personal files, be downloaded to the client device 106 or otherwise be made accessible to the client device 106. In contrast, such a policy 133 would not be applied as a result of step 609, and the files specified in the policy 133 would not be accessible to any user of the client device 106. However, in some embodiments, other policies 133 different from the policy 133 applied at step 613 may be applied at step 609.

The flowcharts of FIGS. 2-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language and/or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 2-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, and/or troubleshooting aid. It is understood that all such variations are within the scope of the present disclosure.

The enterprise computing environment 103, the client device 106, and/or other components described herein can each include at least one processing circuit. The processing circuit can include one or more processors and one or more storage devices that are coupled to a local interface. The local interface can include a data bus with an accompanying address/control bus or any other suitable bus structure.

The one or more storage devices for a processing circuit can store data and/or components that are executable by the one or processors of the processing circuit. The management system 116, the directory service 119, and/or other components can be stored in one or more storage devices and be executable by one or more processors. Also, a data store, such as the management system 116 and the directory service 119, can be stored in the one or more storage devices.

The management system 116, the directory service 119, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as a processor in a computer system or other system. Such a computer-readable medium can contain, store, and/or maintain the software or program instructions for use by or in connection with the instruction execution system.

The computer-readable medium can include physical media, such as, magnetic, optical, semiconductor, and/or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It should be emphasized that the above-described examples of the present disclosure are merely possible examples of implementations set forth for a clear understanding of the principles of the disclosure. Many variations and modifications can be made to the above-described example(s) without departing substantially from the spirit and principles of the disclosure. All such modifications and variations are intended to be included herein within the scope of this disclosure and protected by the following claims.

Therefore, the following is claimed:

1. A method, comprising:
   determining, by a computing device, that a first user profile corresponding to a first user logged into a client device is a staging user profile;
   sending, by the computing device, at least one device policy to the client device, the at least one device policy comprising a policy applicable to the client device independent of an association with a user profile, the at least one policy preventing the staging user profile from being added to a list of managed user profiles in a device record associated with the client device, the device record including data for managing the client device when used by a respective managed user account;
   determining, by the computing device, that a second user profile corresponding to a second user logged into the client device is a nonstaging user profile;
   associating, by the computing device, the second user profile with the client device;
   determining, by the computing device, that the second user profile is currently an unmanaged user profile;
   adding, by the computing device, the second user profile to the list of managed user profiles in the device record associated with the client device; and
   sending, by the computing device, at least one user policy to the client device, the at least one user policy being associated with the second user profile.

2. The method of claim 1, wherein the at least one device policy specifies a first requirement that disk encryption be enabled for the client device or a second requirement that particular files associated with second user profile be encrypted on the client device when stored on the client device or in use by the client device.

3. The method of claim 1, wherein the at least one user policy specifies at least one application to be installed on the client device.

4. The method of claim 1, wherein the at least one user policy is specified by the second user profile.

5. The method of claim 1, wherein at least one of the first user profile or the second user profile corresponds to a network user account provided by a directory service.

6. The method of claim 1, wherein at least one managed user profile from the list of managed user profiles triggers an enforcement of the at least one user policy after the at least one managed user profile is logged on to the client device.

7. The method of claim 1, wherein determining that the second user profile is currently an unmanaged user profile further comprising:
   determining that the second user profile is not included in the list of managed user profiles in the device record.

8. A system, comprising:
   a computing device comprising a processor and a memory; and
   machine readable instructions stored in the memory that, when executed by the processor, cause the computing device to at least:

determine that a first user profile corresponding to a first user logged into a client device is a staging user profile;

send at least one device policy to the client device, the at least one device policy comprising a policy applicable to the client device independent of an association with a user profile, the policy preventing the staging user profile from being added to a list of managed user profiles in a device record associated with the client device, the device record including data for managing the client device when used by a respective managed user account;

determine that a second user profile corresponding to a second user logged into the client device is a non-staging user profile;

associate the second user profile with the client device;

send at least one user policy to the client device, the at least one user policy being associated with the second user profile; and add the second user profile to the list of managed user profiles in the device record of the client device based on an initial logon to the client device with the second user profile.

9. The system of claim 8, wherein the machine readable instructions further cause the computing device to bind the client device to a directory service, wherein at least one of the first user profile or the second user profile corresponds to a network account provided by the directory service.

10. The system of claim 8, wherein the at least one device policy is sent based at least in part on a device profile for the client device.

11. The system of claim 8, wherein the at least one user policy specifying that usage of an application installed on the client device by a user represented by the second user profile be limited in a manner specified by the at least one user policy.

12. The system of claim 8, wherein the at least one user policy comprises a policy to download at least one file owned by the second user profile to the client device.

13. The system of claim 8, wherein the at least one device policy specifies a first requirement that disk encryption be enabled for the client device or a second requirement that particular files associated with the second user profile be encrypted on the client device when stored on the client device or in use by the client device.

14. A non-transitory computer-readable medium embodying a program executable in a computing device, wherein the program is configured to cause the computing device to at least:

authenticate a staging account based on a first user authentication message received from a client device;

send a first policy to the client device in response to a connection by the client device to the program executing on the computing device, the connection being made on behalf of the staging account, the first policy preventing the staging account from being added to a list of managed user accounts in a device record associated with the client device, the device record including data for managing the client device when used by a respective managed user account authenticate a user account based on a second user authentication message received from the client device;

determine that the user account is currently an unmanaged user account based on the second user authentication message received from the client device;

add the user account to the list of managed user accounts in the device record associated with the client device;

select a second policy to assign to the client device in response to an authentication of the user account, the second policy being associated with the user account; and assign the second policy to the client device.

15. The non-transitory computer-readable medium of claim 14, wherein the first policy enforces restrictions associated with the staging account.

16. The non-transitory computer-readable medium of claim 14, wherein the program is further configured to bind the client device to a directory service, wherein the user account corresponds to a network account provided by the directory service.

17. The non-transitory computer-readable medium of claim 14, wherein the second user authentication message comprises a message for a first login to the client device with the user account.

18. The non-transitory computer-readable medium of claim 14, wherein the first policy identifies an application to be installed on the client device.

19. The non-transitory computer-readable medium of claim 18, wherein the application is configured to implement a policy transmitted from a management server.

20. The non-transitory computer-readable medium of claim 14, wherein the second policy comprises a setting for an application installed on the client device.

* * * * *